Figure 1:
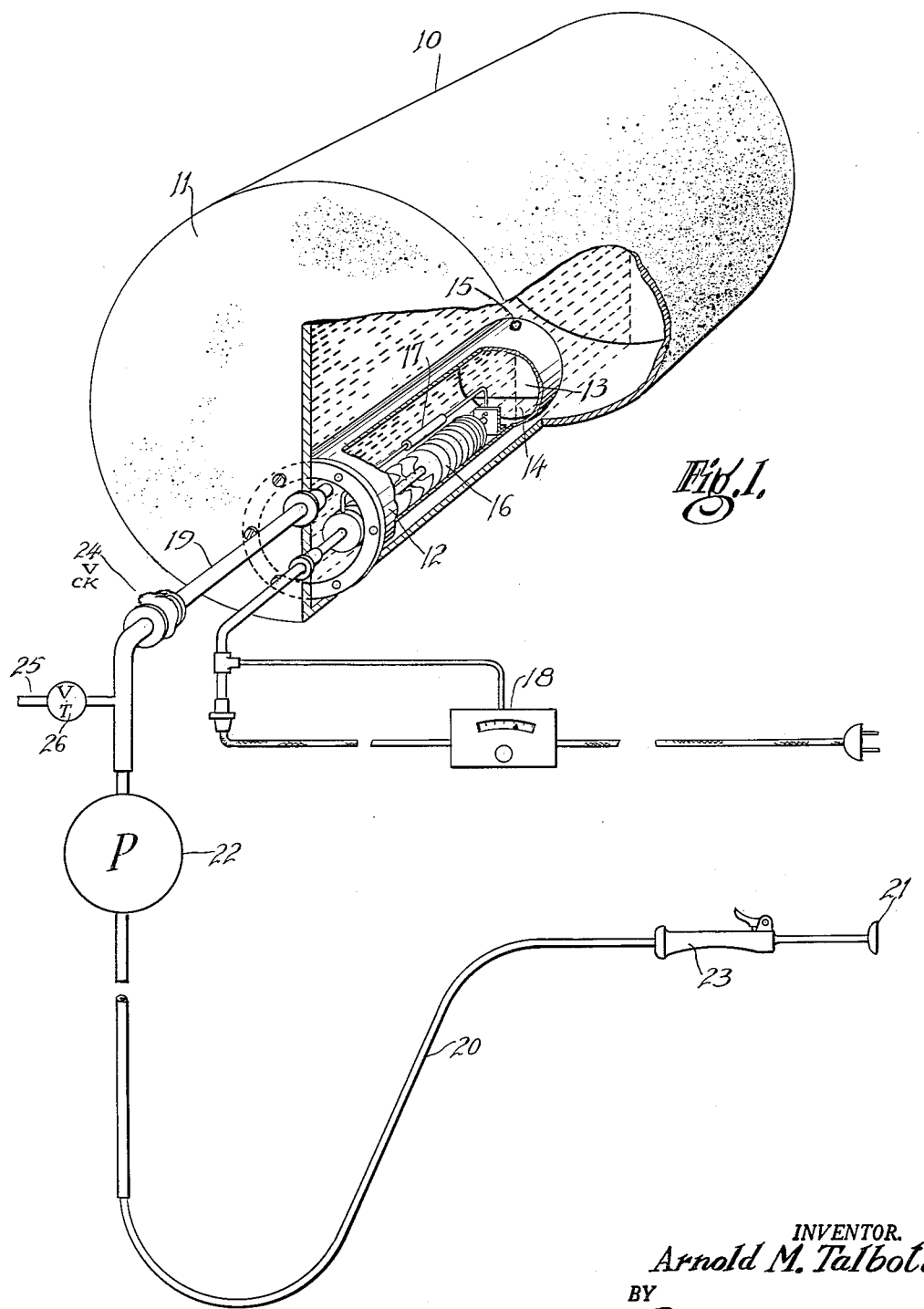

May 15, 1956 A. M. TALBOTT 2,745,572
DISPENSING SYSTEM FOR APPLYING MOLASSES TO STOCK FEED
Filed Nov. 28, 1952 2 Sheets-Sheet 1

INVENTOR.
Arnold M. Talbott
BY
Pollard & Johnston
ATTORNEYS

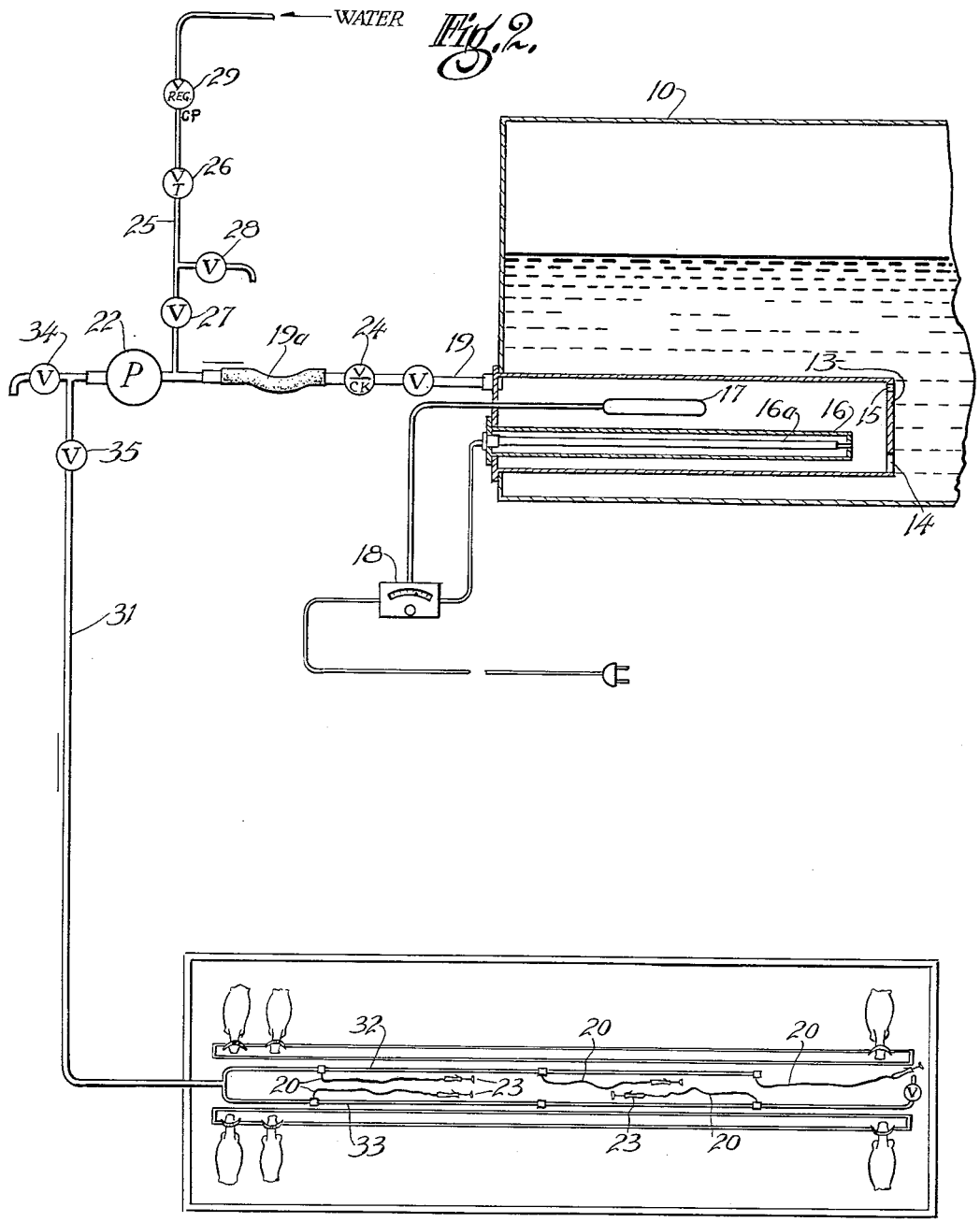

United States Patent Office 2,745,572
Patented May 15, 1956

2,745,572

DISPENSING SYSTEM FOR APPLYING MOLASSES TO STOCK FEED

Arnold M. Talbott, Rye, N. Y.

Application November 28, 1952, Serial No. 322,959

11 Claims. (Cl. 222—1)

This invention relates to a dispensing system for flowing and applying molasses in controlled amounts to feed to be used for livestocks. Cold molasses is a viscous, non-readily flowable mass not easily handled by dairymen or stock feeders on farms.

When molasses is used or piped in large quantities in commercial operations, pumping of the liquid in cool weather is ordinarily facilitated by means of a high capacity heater capable of raising the temperature of the molasses in the flow line to a level at which the viscosity is lowered to a point where ready flow is obtainable in large pipes. However, molasses is used in relatively small quantities for the feeding of stock on farms and high capacity heating equipment cannot economically be employed. Although the body heat given off by cattle increases the temperature in dairy barns to a surprising degree, the atmosphere therein in cool weather is not warmed sufficiently to permit ready flow and distribution of commercial molasses of standard grade in small pipes.

Dairy farms using molasses customarily receive the same in drums, and the dairymen dispense the liquid therefrom in cans but this method of operation is so time consuming and messy that such requirements have been a deterrent to the utilization of molasses on farms as a feed supplement for cattle and other stock in spite of the known nutritive value of molasses. The initial cost of an insulated storage tank and heater for the molasses and the running cost of heating the same are prohibitively high for many farms.

An object of the present invention is to provide a dispensing system for the application of molasses to feed for stock on farms which involves low cost construction and equipment and low costs in connection with their operation capable of functioning at all winter temperatures as well as in summer. Another object is to provide a heating and pumping installation having relatively low wattage requirements such that the equipment can be connected into the ordinary electric light circuit available in the usual dairy barn.

The complete dispensing system of the present invention capable of economically distributing molasses at all temperatures involves the combination of a storage tank, an auxiliary tank connected to the storage tank having a heating means therein, a discharge pipe connected to said auxiliary tank, a high pressure pump in said pipe for drawing the molasses from the tanks and for forcing it through a small pipe distribution means or system to the point or points of use and a tap water inlet pipe leading into the suction pipe connecting the auxiliary tank and the pump, for diluting the molasses flowing to the pump.

In very cold weather or in connection with installations where the storage tank is outside of the barn and exposed to very cold temperatures, the heating of the molasses in the auxiliary tank is necessary to cause the liquid to flow to the pump. Dilution of the molasses with water is ordinarily also necessary in order to facilitate flow of the molasses through the pipe distribution system to the point or points of consumption and in any event dilution can serve advantageously for preventing the molasses from blocking the distribution system during shut down periods thereby to permit or facilitate resumption of flow at the next feeding.

In not so cold or cool weather, it may not be necessary to use the heater, for the suction power of the pump and the dilution is sufficient to provide adequate flowability of the molasses. In warm or summer weather, of course, neither the heater nor dilution is required, but the addition of water may be continued if desired, as for the sake of uniformity of operation or other reason.

The dispensing system of the invention utilizes the following equipment: A storage tank is employed for the molasses, such as a 1000 gallon capacity fuel oil storage tank, modified as described below. This tank need not be insulated, for the whole body of molasses therein is not to be heated.

A smaller tank, as one of 25 gallon capacity or a capacity sufficient to provide molasses required for a single feeding of the herd to be fed, hereinafter referred to as the heating tank or the feed tank, is connected to said storage tank and serves as a temporary storage tank for trapping the molasses during heating. In accordance with a feature of the present invention in its preferred embodiment, the feed tank is mounted within the storage tank and is attached to the end wall thereof such that it will be substantially completely surrounded by the molasses in the larger storage tank. When the feed tank is cylindrical in shape one end of the same may be mounted in the head of the storage tank. This construction takes advantage of the observed inherent high insulating quality of viscous molasses in the outer tank. The relatively small amount of heat taken up in the outer body facilitates flow of the molasses into the heating tank.

In the other end of the feed tank, a passageway or opening is provided at the lower end for the movement of molasses from the storage tank into the feed tank. This passageway is of a sufficiently large area to permit the flow of cold, viscous molasses to take place, a number of square inches of opening being ordinarily required for flow therethrough. The molasses is trapped within the said feed tank and is held there until it has been heated to a temperature at which its viscosity will permit adequate flowability.

A relatively low wattage heating means is connected to the feed tank and most suitably is an immersion heater mounted therewithin. This heater preferably operates on 500 watts but may, if required and permissible in the electric circuit at hand, be operated on 800 watts or more. It may be and preferably is composed of wires or rods mounted and encased in metal tubing of any suitable metal. Alternatively, it may be a conventional cable heating element available on the market, the wires of which have been coated with material resistant to the action of the components of molasses at the high surface temperature encountered. The structure of the heater should be such as to provide a large amount of surface at temperatures insufficient to cause decomposition or carbonization of the molasses. The heating element can also be of the coil, ribbon, or grid type. The heater is controlled by a thermostat in conventional manner, whereby the molasses in the said tank may be maintained at the desired pumpable viscosity.

The end of the said heating tank opposite the hereinbefore mentioned passageway has a discharge conduit connected thereto for conveying the molasses from the feed tank and storage tank to the distribution pipes or outlets. The initial section of the pipe or conduit adjacent the tank should be of a diameter of at least two inches and connects to a pressure pump of adequate capacity and high pressure, mounted as close as is practicable to the storage tank. The large connection pipe is necessary to facilitate flow when the molasses is cool and viscous as when the heater has not been employed or regulated to provide a substantial increase in temperature. The distribution may be effected through a single small pipe terminating if desired in a valved sprinkling device or spray head. Alternatively, the conduit may be connected to a permanently mounted pipe distribution system utilizing small pipes as of one inch diameter, each leading to a bank of feed positions or troughs, and terminating in such manner as to permit discharge of the molasses into the chopped alfalfa or other feed. A meter may be employed to determine and control the rate of flow but such is not necessary.

The introduction of a small amount of water into the suction line ahead of the pump is an important feature of the invention, for it lessens the heat requirement and reduces the costs of operation. It has been discovered that as little as 5–15% addition of water will reduce the viscosity and immobility by a very substantial amount. This embodiment is particularly important under cooler atmospheric conditions or where the distribution pipe lines are long and the molasses is likely to cool excessively or congeal before it is discharged or where such lines have not been in use for some hours. The amount of water to be added may be easily controlled by a valve or by a suitable orifice, and the adequacy of the addition can be determined by observation of the readiness of flow or by gravity testing of the diluted molasses flowing from the discharge outlet.

The pump under ordinary conditions encountered serves to mix the water with the molasses to provide uniform mixtures.

To prevent back flow of water into the storage tank where damage by fermentation might occur, the suction line between the tank and the pump may be provided with a check valve.

Under severe weather conditions requiring heat, the heater may be turned on only for the period necessary to heat the molasses in the heating tank to the desired temperature for flowing the same to the pump and/or through the dispensing system and distributing the same. This period may take from one to several hours depending upon a number of factors, particularly the atmospheric temperature surrounding the storage tank.

In a preferred embodiment of the invention, the pump employed is of a character possessing a flow back by-pass whereby the pump may continuously operate whether the valve in the discharge pipe is open or not. A rotary gear pump, with a by-pass set to recirculate at 150 pounds pressure having a two and a half gallon per minute capacity is satisfactory with the system herein described.

The measurement of the molasses may be effected on a time basis by ascertainment of the rate of flow. The nozzle or pipe end may be placed in a receptacle of known content, as a quart bottle, and the time for filling may then be ascertained. Thereafter the molasses may be dispensed on a time basis without the use of the receptacle, for the temperature and pressure of the molasses will remain constant or approximately so during the feeding. The cost of an expensive meter is thereby avoided.

With reference to Figure 1 of the accompanying drawing wherein the figure is a diagrammatic representation in perspective, there is illustrated an uninsulated storage tank 10 having a feed tank 12 mounted in a head plate 11. The inside head plate of this feed tank is in the form of an apron 13 which leaves an opening or passage 14 of substantial area, as of twelve square inches, through which cool or cold viscous molasses may readily flow from the storage tank into the feed tank. The uppermost portion of the feed tank, adjacent the apron 13, is provided with a small vent 15 to permit air to escape from the feed tank so the feed tank will not become air bound.

An electrical immersion heater 16 is mounted within the feed tank near the bottom thereof and extends substantially over its whole length and is supported on the bottom of the feed tank. The heating element within the heater unit is connected through a thermostat control composed of a bulb 17 and a regulating switch 18 for the selection of the temperature level to be attained in the heating or feed tank.

A discharge pipe 19 is connected to the end plate of the feed tank through a check valve 24 to an electrically operated pressure pump 22 to the distribution system composed of a pipe connected to a small diameter flexible hose 20 terminating in a spray nozzle 21. Control of flow of molasses from the nozzle is effected by means of a quickly acting on-off valve 23. A small conduit 25 is connected to the suction line adjacent the pump for the introduction of water into the molasses. This conduit is provided with a regulating valve 26 and preferably also an automatic solenoid valve operating simultaneously with the pump (not shown).

When molasses is first introduced into the storage tank, a portion of the same will flow through the passageway 14 and fill the feed tank 12. In operating the system during extreme outside weather conditions, the circuit is closed leading to the heater 16, and the thermostat control 18 set to heat the molasses to a suitable level, usually between about 50° and 75° C. This heating is commenced an hour or more ahead of the stock feeding time to permit the required temperature to be reached in the heating tank at the stock feeding time. When conditions require it, water is added to the molasses to facilitate the flow.

The embodiment of the invention illustrated in Figure 2 shows the storage tank and heating system in sectional elevation and the distributing pipes installed in a dairy barn, the latter being shown in a plan view on a very much reduced scale. This embodiment represents a more complete installation containing additional practical features capable of effecting more satisfactory operation. The installation differs from that of Figure 1 primarily in the means employed for regulating the supply of tap water and in the distribution system.

The water line 25 not only contains the water regulating valve 26 but also a quick acting shut off valve 27, a test cock 28 and a constant pressure regulating valve 29. By closing the shut off valve 27, opening the test cock 28 and adjusting the water regulating valve 26, the rate of flow of water can be adjusted to and set at any dilution desired. The rate of flow may be determined by collecting the water discharged from the tap in a quart bottle and noting the time of filling. When the rate of flow is once determined and set the valve 26 may be permitted to remain set during subsequent feedings and the shut off valve 27 may thereafter be used for commencing and stopping the flow in connection with each use of the system. The pipe 31 may be provided with a test cock 34 and a shut off valve 35, for determining the rate of flow and quality of molasses leaving the pump. Where barns are not equipped with a constant pressure water supply, the constant pressure water regulating valve 29 is employed.

In this second embodiment the heater 16 is composed of a simple metal tube 16 having therein an electrical heating element 16a, this type of heater being well known.

Since storage tanks of the size contemplated in connection with the present invention are extremely heavy when filled with molasses and unyielding support of the same may be difficult in the ordinary installation, it has been found desirable to insert a section of flexible hose 19a in the discharge conduit 19 to avoid breaking piping or connections.

The two inch diameter conduit 19 is bushed down to a 1¼ inch conduit near the pump such that it can connect with the preferred pump employed. By connecting the water pipe 25 into the molasses conduit 19 closely adjacent the pump and installing a large check valve 24 in the larger section of pipe 19 at an adequate distance from the point of water introduction, alternate surging of water and molasses through the dispensing system is avoided. The distance from the pump to the storage tank is suitably from three to five feet.

The discharge pipe leading from the pump 22 is bushed down to a one inch pipe 31 which in turn is connected to branch pipes 32 and 33 mounted in the dairy barn adjacent and above feeding stations. These branch pipes are connected to valved flexible hoses 20 at suitable intervals such that the molasses can be supplied to banks of feeding stations or boxes for the individual animals.

In a typical operation of the dispensing system, the rate of flow of molasses from the test cock 34 will be 2½ gallons a minute, the water valve 27 being in closed position. The flow of water through the test valve 28, obtained by adjusting the regulating valve 26, will reveal a rate of one quart per minute. When the test cocks 28 and 34 are closed and the valves 27 and 35 are opened, water will be added to the molasses and will provide a diluted molasses of approximately 74° Brix. With this dilution, the molasses flows readily and rapidly through the small diameter distribution pipes. If the molasses in the storage tank is too cold and does not flow adequately through the pump and out the test cock 34, then the heater 16 must be employed.

Although the present system is particularly designed for use in connection with the feeding of dairy and other stock on farms, it will find special utility for applying molasses during preparation of silage and in tanks used in commercial feed mixing establishments.

The dispensing system of the present invention has the following advantages:

1. Molasses may be utilized on stock farms during cold weather as well as during warm weather without the usual difficulties encountered in the flowing and measuring of the viscous liquid.

2. The equipment is low in initial cost, for no complicated or difficult-to-obtain equipment or parts are required. No expensive insulation is required for the storage tank, for the viscous molasses in the storage tank surrounding the feed tank serves as insulation. Installation cost is low and the tanks need not be buried.

3. The system is low in operating cost, for in cool weather, only water is required to facilitate the molasses flow, and in very cold weather, the whole amount of molasses in the storage tank is not heated or maintained in heated condition, but only the amount of molasses to be fed at a single feeding is heated and this amount need not be maintained at the raised temperature for more than a short time.

4. The viscosity and flowability of the molasses through the dispensing system can be controlled simply by adjusting the amount of dilution with water flowing from a tap.

5. The heater is of low wattage rating and hence can be connected into the ordinary farm light circuit already available in most dairy and stock farms without the installation of special power circuits.

6. The dispensing of the molasses may be very easily and accurately effected in the minimum of time, for the diluted and/or warmed molasses flows quickly upon the opening of the valve connected to the discharge outlet or outlets and is instantly stopped upon closing the same.

7. The molasses can be delivered in bulk to farms by tank truck and pumped into the storage tank, inside or outside the barn. The handling of heavy drums as in the past is avoided. A substantial saving in labor is effected in dispensing and transporting the molasses to the feeding locations to which the molasses is to be added.

The dilution feature of the invention is made feasible by the fact that the water is added to the molasses immediately before it is pumped and applied to the feed and thereafter not stored in the tank. Hence no molasses which has been diluted below the 79.5° Brix of the standard grade molasses is stored such that fermentation becomes a problem.

It should be understood that the present invention is not limited to the specific details of construction herein described, but that it extends to all equivalents which will occur to those skilled in the art upon consideration of the scope of the claims appended hereto.

I claim:

1. A farm storage and dispensing system for applying molasses to stock feed, which comprises a storage tank for the molasses, a temporary storage feed tank insulated from cold atmosphere during use, of a capacity substantially less than that of the storage tank, a passageway connecting the interior of the storage tank with that of the feed tank of an area suitable for the flow of cool viscous molasses, a thermostatically controlled electric heating element responsive to temperatures within said feed tank capable of raising and maintaining the temperature of the molasses within the feed tank to a level at which it can be readily pumped, a discharge outlet in said feed tank for the warmed molasses connected to a pipe line for distributing the same, a high pressure suction pump in said pipe line and a conduit for the introduction of water connected to said pipe line on the suction side thereof.

2. A farm storage and dispensing system for applying molasses to stock feed, which comprises, an uninsulated storage tank for molasses of at least 79.5° Brix, a high pressure pump capable of forming a uniform mixture of molasses with water, a conduit means connecting said tank with said pump, a temporary storage tank for heating molasses connected in said conduit means, a valved inlet water pipe connected to said conduit means at a point ahead of the pump intake, and a pipe line connected to said pump for discharging the molasses on the stock feed.

3. A farm storage and dispensing system for applying molasses to stock feed, which comprises, an uninsulated storage tank for the molasses, a temporary storage feed tank of substantially lesser capacity than said storage tank mounted therewithin and spaced for the most part from the walls thereof, an inlet in the wall of said feed tank of an area capable of admitting cool, viscous molasses from said storage tank into said feed tank, a thermostatically controlled electric heating element connected with said apparatus responsive to temperatures within said feed tank capable of raising and maintaining the temperature of the molasses within the feed tank at a level at which it can be readily pumped, a discharge outlet in said feed tank for the warmed molasses connected to a pipe line for distributing the same, a high pressure rotary gear pump in said pipe line and a conduit for the introduction of water connected to said pipe line on the suction side thereof.

4. A farm storage and dispensing system for applying molasses to stock feed, which comprises, an uninsulated storage tank for the molasses, an elongated temporary storage feed tank of substantially lesser capacity than said storage tank mounted within said storage tank by attachment of one end thereof to a wall of the storage tank, a passageway in the other end of and at a lower level in said feed tank connecting said tank with the storage tank, whereby cool, viscous molasses may flow from the storage tank to the feed tank, a thermostatically controlled electric heating element responsive to temperatures within said feed tank capable of raising and maintaining the temperature of the molasses within the feed tank to a level at which it can be readily pumped, a discharge outlet in said feed tank for the warmed molasses connected to a pipe line for distributing the same, a suction pump in said pipe line and a conduit for the introduction of water connected to said pipe line on the suction side thereof.

5. A farm storage and dispensing system for applying molasses to stock feed, which comprises, an uninsulated storage tank for molasses of at least 79.5° Brix, a feed tank insulated from cold atmosphere during use, of a capacity substantially less than that of the storage tank, a passageway connecting the interior of the storage tank with that of the feed tank of an area suitable for the flow of cool viscous molasses, an electric heating element of relatively small wattage consumption within said feed tank, a thermostat control connected with said heating elements responsive to temperature changes in said feed tank, a discharge outlet conduit connected to said feed tank having therein a bypass suction pump, a valved conduit for the introduction of water connected to said conduit on the suction side of said pump, and a stop cock controlling the flow from the discharge end of said conduit.

6. A farm storage and dispensing system for applying molasses to stock feed, which comprises, a storage tank for molasses of at least 79.5° Brix, a feed tank insulated from cold atmosphere during use, of a capacity substantially less than that of the storage tank capable of holding molasses therein during heating, a passageway connecting the interior of the storage tank with that of the feed tank of an area suitable for the flow of cold viscous molasses, an immersion electric heating element of relatively small wattage consumption within said feed tank, a thermostat control connected with said heating element responsive to temperature changes in said feed tank, a discharge outlet conduit connected to said feed tank having a suction pump, a valved conduit for the introduction of water connected to said conduit on the suction side of said pump and a valve in said conduit for distributing the warmed diluted molasses.

7. A dispensing system for applying molasses to stock feed which comprises, an uninsulated storage tank for molasses of at least 79.5° Brix, a pressure pump means for heating a portion of the molasses in said tank, a discharge pipe at least two inches in diameter connecting said tank with a pipe of lesser diameter joined to said pump, a valved inlet conduit for the introduction of water connected to the said pipe of lesser diameter, a check valve in said two inch diameter pipe, and a pipe line connected to the discharge side of said pump of about one inch diameter through which diluted molasses will flow, for dispensing said molasses upon stock feed.

8. A process for storing and dispensing molasses to stock feed on farms under winter as well as summer conditions which comprises, storing the molasses at commercial grade which does not ferment appreciably on standing and when molasses is to be dispensed heating only the portion of the same to be dispensed in a heating zone for the most part within the body of the stored molasses whereby the insulating quality of the stored viscous molasses is utilized in lessening dissipation of heat from the zone, pumping the warmed molasses from said zone when its viscosity has been reduced to a degree permitting flow from the heating zone, introducing water into the warmed molasses during its flow from said zone and then flowing the diluted molasses to one or more points of distribution to the stock feed.

9. A storage and dispensing system for applying molasses to stock feed in barns and other enclosures, which comprises a bulk storage tank exposed to the surrounding atmosphere, a temporary storage and heating tank of a capacity substantially less than that of the first mentioned tank connected through a pipe to said bulk storage tank, means for slowly heating the molasses in said heating tank during its storage therein, a rotary gear pump, a conduit connecting said heating tank with said pump, an inlet water pipe connected into said conduit, means for controlling the rate of flow of water and hence the amount of dilution of the molasses, and a pipe connected to the discharge side of the pump for dispensing the diluted molasses.

10. A process for storing and preparing molasses for dispensing to stock feed on farms under winter conditions which comprises storing the molasses in bulk at commercial grade which does not ferment appreciably on standing and at atmospheric temperature, flowing from the storage zone to a heating zone an amount of cold molasses adequate for a single feeding of the stock to be fed, heating the molasses in said zone, storing the molasses in said heating zone until its temperature is raised and its viscosity is reduced thereby facilitating its flow through pipes of the dispensing system and its mixing with water, flowing the warmed molasses to a pumping means, adding a lesser quantity of water to the warmed molasses during its flow from said heating zone, to said pumping means, agitating the molasses and water in said pump thereby providing a uniform mixture, and pumping the diluted molasses through the remainder of the dispensing system.

11. A process for storing and preparing molasses for dispensing to stock feed on farms under winter conditions which comprises, storing bulk molasses at a Brix of at least 79.5° under atmospheric conditions, at least one hour before feeding time, flowing molasses from the storage zone to a temporary storage and heating zone in an amount adequate for a single feeding of the stock to be fed, slowly heating the molasses in said zone until its temperature is raised and its viscosity is reduced thereby facilitating its flow and its mixing with water, withdrawing the warmed molasses by the action of a pump, adding water to the warm molasses during its passage to the pump in a quantity providing a readily sprayable mixture, mixing the water and the molasses in said pump thereby providing a uniform mass, and pumping the diluting molasses further in the dispensing system.

References Cited in the file of this patent

UNITED STATES PATENTS

| | | |
|---|---|---|
| 1,604,988 | Gilchrist | Nov. 2, 1926 |
| 1,631,530 | Hoffman | June 7, 1927 |
| 1,723,082 | Schumann | Aug. 6, 1929 |
| 1,761,942 | Strickland | June 3, 1930 |
| 1,929,231 | Yirava | Oct. 3, 1933 |
| 2,061,014 | Wade | Nov. 17, 1936 |
| 2,378,184 | Carlson | June 12, 1945 |
| 2,396,305 | Toft | Mar. 12, 1946 |
| 2,411,749 | Oberly et al. | Nov. 26, 1946 |
| 2,554,802 | Waas | May 29, 1951 |